(12) United States Patent
Abdel-Hafez et al.

(10) Patent No.: US 9,115,896 B2
(45) Date of Patent: Aug. 25, 2015

(54) FUEL-AIR MIXER FOR USE WITH A COMBUSTOR ASSEMBLY

(75) Inventors: Ahmed A. Abdel-Hafez, Niskayuna, NY (US); Ahmed Mostafa EL Kady, Mason, OH (US); Nan Zong, Mason, OH (US); Richard Bradford Hook, Jr., West Chester, OH (US); Steven Handelsman, Cincinnati, OH (US)

(73) Assignee: General Electric Company, Niskayuna, NY (US)

( * ) Notice: Subject to any disclaimer, the term of this patent is extended or adjusted under 35 U.S.C. 154(b) by 413 days.

(21) Appl. No.: 13/563,251

(22) Filed: Jul. 31, 2012

(65) Prior Publication Data

US 2014/0033722 A1     Feb. 6, 2014

(51) Int. Cl.
*F23R 3/14* (2006.01)
*F23C 7/00* (2006.01)
*F23R 3/28* (2006.01)

(52) U.S. Cl.
CPC . *F23R 3/14* (2013.01); *F23C 7/004* (2013.01); *F23R 3/286* (2013.01); *Y02E 20/14* (2013.01); *Y10T 29/49323* (2015.01)

(58) Field of Classification Search
CPC ............. F23R 3/14; F23R 3/286; F23C 7/004
USPC .................................... 60/737, 748, 740, 742
See application file for complete search history.

(56) References Cited

U.S. PATENT DOCUMENTS

| | | | |
|---|---|---|---|
| 5,165,241 A | 11/1992 | Joshi et al. | |
| 5,511,375 A | 4/1996 | Joshi et al. | |
| 5,675,971 A | 10/1997 | Angel et al. | |
| 5,680,766 A | 10/1997 | Joshi et al. | |
| 6,141,967 A | 11/2000 | Angel et al. | |
| 6,871,501 B2 | 3/2005 | Bibler et al. | |
| 6,993,916 B2 | 2/2006 | Johnson et al. | |
| 7,159,403 B2 | 1/2007 | Kastrup et al. | |
| 7,631,500 B2 | 12/2009 | Mueller et al. | |
| 2008/0163627 A1* | 7/2008 | ELKady et al. | 60/737 |
| 2009/0056336 A1 | 3/2009 | Chila et al. | |
| 2010/0236252 A1* | 9/2010 | Huth | 60/772 |

* cited by examiner

*Primary Examiner* — Phutthiwat Wongwian
*Assistant Examiner* — Marc J Amar
(74) *Attorney, Agent, or Firm* — John P. Darling

(57) ABSTRACT

A fuel-air mixer for use with a combustor is provided. The fuel-air mixer includes an outer ring, an intermediate hub disposed coaxially within the outer ring such that a first plenum is formed therebetween, and an inner hub disposed coaxially within the intermediate hub such that a second plenum is formed therebetween. A first swirler including a plurality of first swirler vanes is positioned between the outer ring and the intermediate hub, wherein the first swirler is configured to rotate fluid flowing therethrough in a first direction. A second swirler including a plurality of second swirler vanes is positioned between the intermediate hub and the inner hub, wherein the second swirler is configured to rotate fluid flowing therethrough in a second direction. A plurality of fuel injection conduits are also defined within the fuel-air mixer for channeling fuel to the first and second plenums.

15 Claims, 8 Drawing Sheets

FUEL-AIR MIXER FOR USE WITH A COMBUSTOR ASSEMBLY

BACKGROUND

The field of the present disclosure relates generally to turbine engines and, more specifically, to a fuel-air mixer for use with a combustor assembly.

Rotary machines, such as gas turbines, are used to generate power for electric generators. Gas turbines, for example, have a gas path which typically includes, in serial-flow relationship, an air intake, a compressor, a combustor, a turbine, and a gas outlet. Compressor and turbine sections include at least one row of circumferentially spaced rotating buckets or blades positioned within a housing. At least some known turbine engines are used in cogeneration facilities and power plants. Such engines may have high specific work and power per unit mass flow requirements. To increase the operating efficiency, at least some known turbine engines, such as gas turbine engines, may operate with increased combustion temperatures. Generally, in at least some known gas turbine engines, engine efficiency increases as combustion gas temperatures increase.

However, operating known turbine engines at higher temperatures may also increase the generation of polluting emissions, such as oxides of nitrogen ($NO_X$). Such emissions are generally undesirable and may be harmful to the environment. At least some known turbine assemblies facilitate reducing NOx emissions by using pre-mixing technology. Pre-mixing fuel and air facilitates inhibiting the temperature of combustion gases such that the combustion temperature does not rise above the threshold where NOx emissions are formed.

Natural gas is used in at least some known pre-mixers. Natural gas is a fuel mainly composed of methane that has a tendency to burn cleaner compared to other known hydrocarbon fuels. Due to the limited availability of natural gas, the use of non-conventional fuels may be desirable. However, non-conventional fuels such as weak natural gas, for example, contain up to 60-70% of inert compounds by volume. As such, non-conventional fuels have a modified Wobbe index (MWI) number outside of the MWI range that can be accommodated by known fuel nozzles.

BRIEF DESCRIPTION

In one aspect, a fuel-air mixer is provided. The fuel-air mixer includes an outer ring, an intermediate hub disposed coaxially within the outer ring such that a first plenum is formed therebetween, and an inner hub disposed coaxially within the intermediate hub such that a second plenum is formed therebetween. A first swirler including a plurality of first swirler vanes is positioned between the outer ring and the intermediate hub, wherein the first swirler is configured to rotate fluid flowing therethrough in a first direction. A second swirler including a plurality of second swirler vanes is positioned between the intermediate hub and the inner hub, wherein the second swirler is configured to rotate fluid flowing therethrough in a second direction. A plurality of fuel injection conduits are also defined within the fuel-air mixer for channeling fuel to the first and second plenums.

In another aspect, a method of assembling a fuel-air mixer is provided. The method includes providing an outer ring, positioning an intermediate hub coaxially within the outer ring such that a first plenum is formed therebetween, positioning an inner hub coaxially within the intermediate hub such that a second plenum is formed therebetween, coupling a first swirler between the outer ring and the intermediate hub, and coupling a second swirler between the intermediate hub and the inner hub. The first swirler includes a plurality of first swirler vanes configured to rotate fluid flowing therethrough in a first direction and the second swirler includes a plurality of second swirler vanes configured to rotate fluid flowing therethrough in a second direction. The method also includes defining a plurality of fuel injection conduits within the fuel-air mixer for channeling fuel to the first and second plenums.

In yet another aspect, a combustor assembly is provided. The combustor assembly includes a combustor and a fuel-air mixer coupled to the combustor. The fuel-air mixer includes an outer ring, an intermediate hub disposed coaxially within the outer ring such that a first plenum is formed therebetween, and an inner hub disposed coaxially within the intermediate hub such that a second plenum is formed therebetween. A first swirler including a plurality of first swirler vanes is positioned between the outer ring and the intermediate hub, wherein the first swirler is configured to rotate fluid flowing therethrough in a first direction. A second swirler including a plurality of second swirler vanes is positioned between the intermediate hub and the inner hub, wherein the second swirler is configured to rotate fluid flowing therethrough in a second direction. A plurality of fuel injection conduits are also defined within the fuel-air mixer for channeling fuel to the first and second plenums.

DRAWINGS

DETAILED DESCRIPTION

Embodiments of the present disclosure are directed to turbine engines and, more specifically to a fuel-flexible fuel-air mixer that facilitates reducing NOx emissions and enables the use of non-conventional fuels. Even more specifically, embodiments of the present disclosure are directed to a dual-annular counter-rotating swirler (DACRS) pre-mixer that includes an inner swirler and an outer swirler for mixing fuel and air. For example, the fuel-air mixer described herein includes fuel injection conduits that deliver fuel to the inner swirler.

Generally, standard pipeline quality natural gas has an MWI number of approximately 51±2, and standard fuel nozzles are designed to accommodate fuels having an MWI number of about 40 to about 60. However, non-conventional fuels, such as weak natural gas, have MWIs outside of the acceptable range of standard fuel nozzles. When non-conventional fuels have a low MWI number, for example, the flow rate of fuel through the fuel injection conduits of standard fuel nozzles must be increased to compensate for the increased amount of inert compounds in the weak gas stream. This high fuel jet velocity through the fuel injection conduits may result in a large pressure drop across the injection ports. Accordingly, there is an increased potential for flame anchoring, combustion instabilities, and fuel nozzle component failure. Furthermore, high fuel jet velocity and a large fuel-air ratio in only the outer swirler may result in the creation of polluting NOx emissions.

In the exemplary embodiments, the inner swirler and the outer swirler are both configured to pre-mix fuel with air prior to use in the combustor. More specifically, the inner swirler includes a plurality of swirler vanes that rotate a fuel-air mixture in a first direction, and the outer swirler includes a plurality of swirler vanes that rotate a fuel-air mixture in a second direction that may be different from the first direction. Generally, the inner swirler of standard fuel nozzles is fuel-free and only facilitates creating a counter-rotating vitiated airflow stream. Pre-mixing fuel and air in both the inner and outer swirlers facilitates increasing the amount of fuel that may be injected into the fuel-air mixer and facilitates creating a uniform radial fuel-mole-fraction profile across the fuel-air mixer exit. As such, the fuel flow rate is maintained at optimal levels, thereby enabling the use of non-conventional fuels.

Figure 1:
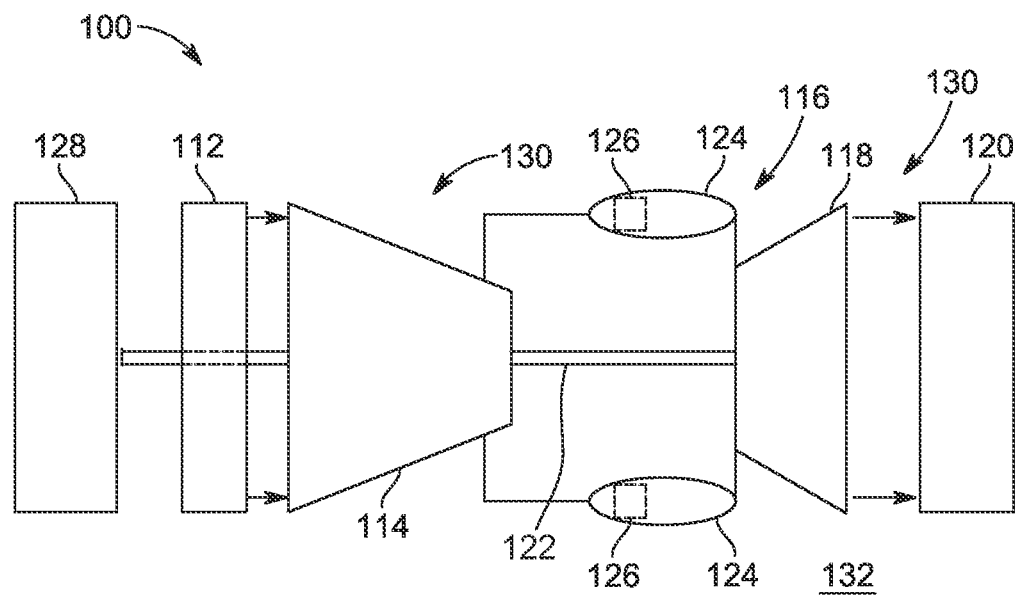
FIG. 1 is schematic view of an exemplary turbine engine.

FIG. 1 is a schematic view of an exemplary turbine engine 100. More specifically, in the exemplary embodiment turbine engine 100 is a gas turbine engine. While the exemplary embodiment illustrates a gas turbine engine, the present invention is not limited to any one particular engine, and one of ordinary skill in the art will appreciate that the fuel-air mixer described herein may be used in connection with other turbine engines.

In the exemplary embodiment, turbine engine 100 includes an intake section 112, a compressor section 114 downstream from intake section 112, a combustor section 116 downstream from compressor section 114, a turbine section 118 downstream from combustor section 116, and an exhaust section 120. Turbine section 118 is coupled to compressor section 114 via a rotor shaft 122. In the exemplary embodiment, combustor section 116 includes a plurality of combustors 124. Combustor section 116 is coupled to compressor section 114 such that each combustor 124 is in flow communication with compressor section 114. A fuel nozzle assembly 126 is coupled within each combustor 124. Turbine section 118 is coupled to compressor section 114 and to a load 128 such as, but not limited to, an electrical generator and/or a mechanical drive application through rotor shaft 122. In the exemplary embodiment, each of compressor section 114 and turbine section 118 includes at least one rotor disk assembly 130 coupled to rotor shaft 122 to form a rotor assembly 132.

During operation, intake section 112 channels air towards compressor section 114 wherein the air is compressed to a higher pressure and temperature prior to being discharged towards combustor section 116. The compressed air is mixed with fuel and other fluids and then ignited to generate combustion gases that are channeled towards turbine section 118. More specifically, the fuel mixture is ignited to generate high temperature combustion gases that are channeled towards turbine section 118. Turbine section 118 converts the energy from the gas stream to mechanical rotational energy, as the combustion gases impart rotational energy to turbine section 118 and to rotor assembly 132.

Figure 2:
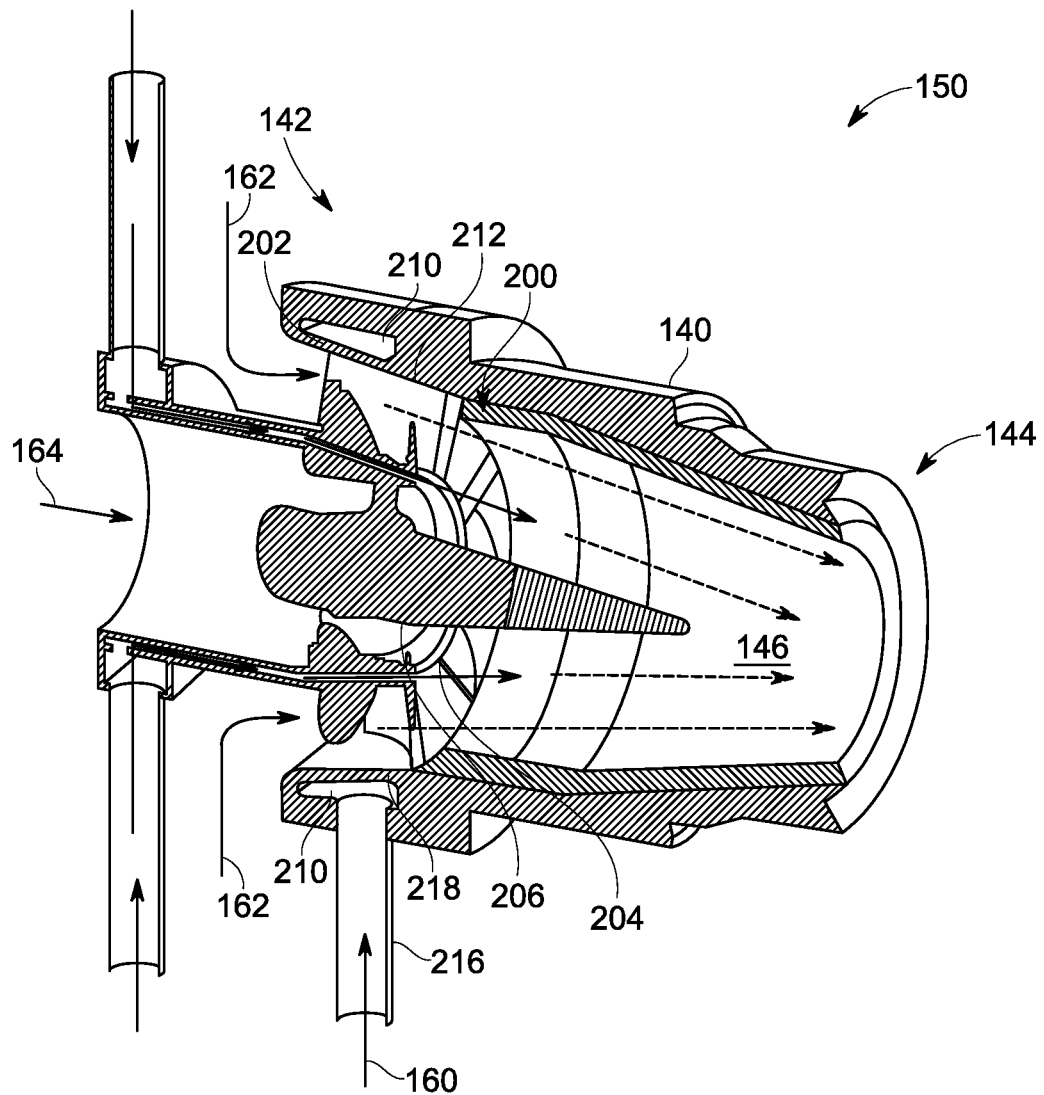
FIG. 2 is a perspective cross-sectional view of an exemplary pre-mixer that may be used with the turbine engine shown in FIG. 1.

FIG. 2 is a perspective cross-sectional view of a pre-mixer 150. In the exemplary embodiment, pre-mixer 150 includes a substantially cylindrical shroud 140 having a first end 142, a second end 144, and a mixing zone 146 defined therebetween. Pre-mixer 150 also includes a fuel-air mixer 200 coupled to shroud 140 at first end 142. In the exemplary embodiment, fuel 160 is channeled into a first fuel plenum 210 via a fuel inlet passage 216. First fuel plenum 210 is substantially annular, extends substantially circumferentially through shroud 140, and is located between an outer surface 218 of outer ring 202 and shroud 140. As such, fuel 160 is channeled into fuel-air mixer 200 to combine with air 162 and 164 that is channeled through fuel-air mixer 200. A fuel-air mixture then exits fuel-air mixer 200 for use in combustor 124 (shown in FIG. 1).

Figure 3:
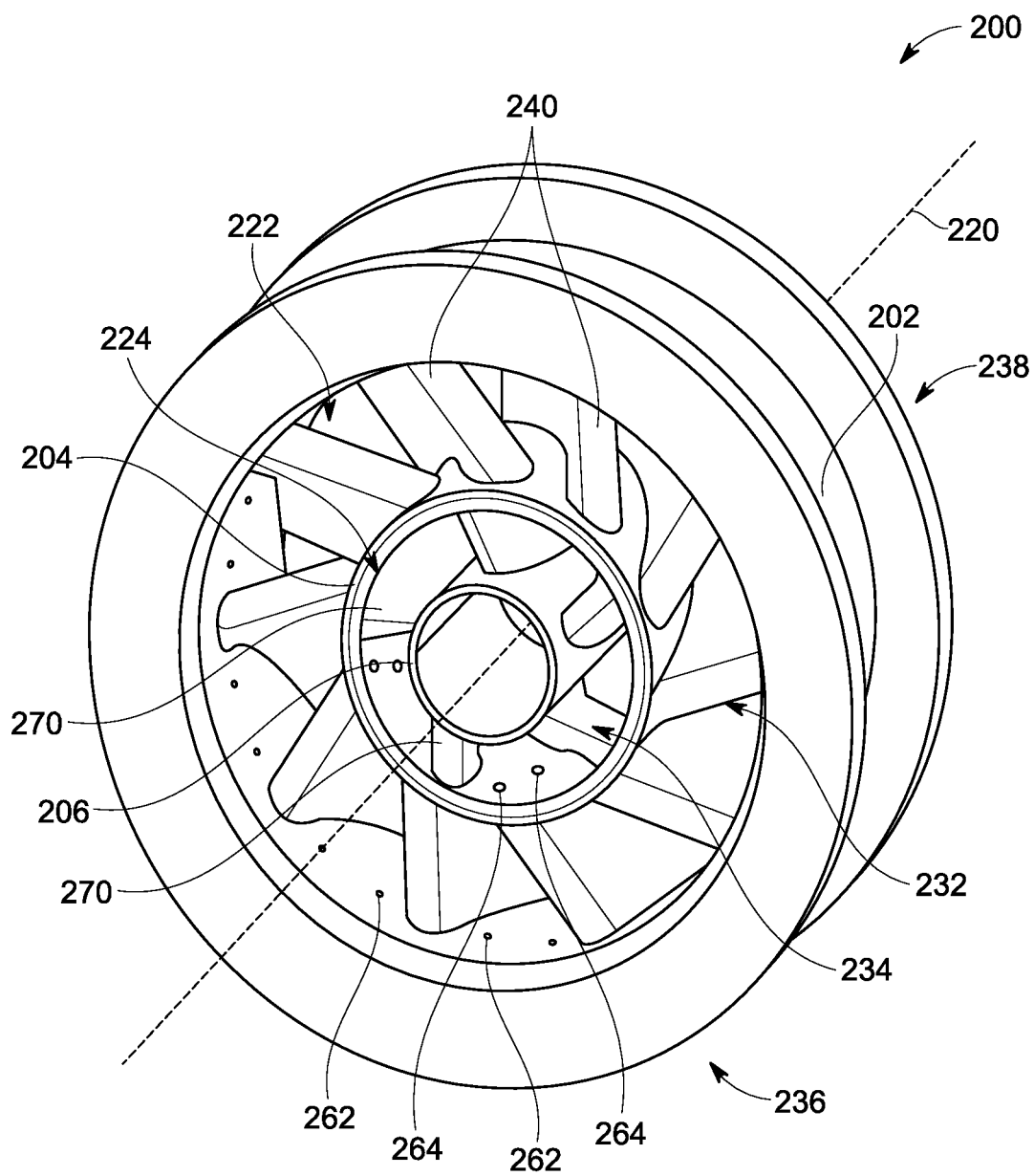
FIG. 3 is a perspective view of an exemplary fuel-air mixer that may be used with the pre-mixer shown in FIG. 2.
Figure 4:
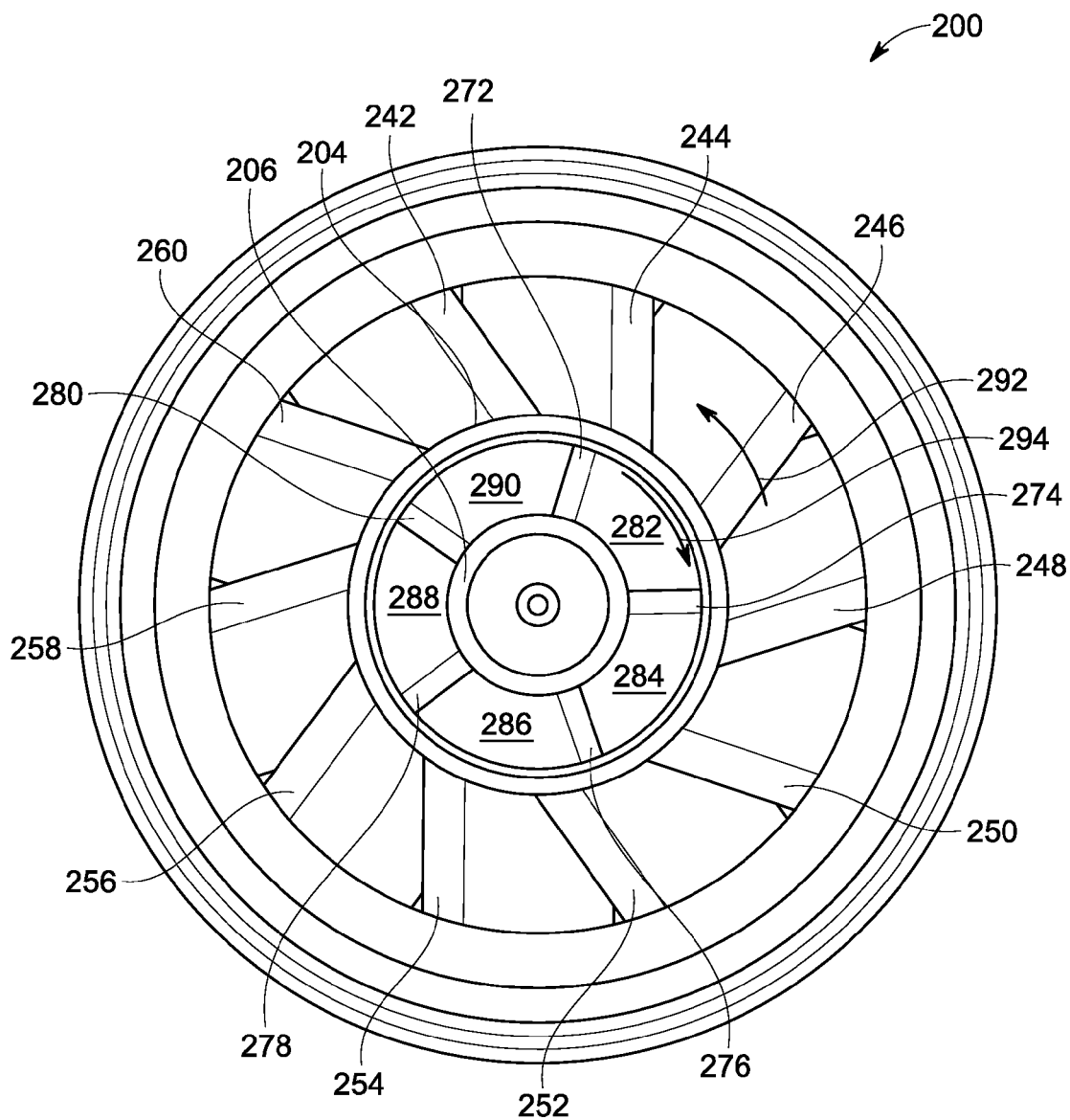
FIG. 4 is an axial view of the fuel-air mixer shown in FIG. 3.

FIG. 3 is a perspective view of fuel-air mixer 200 and FIG. 4 is an axial view of fuel-air mixer 200. In the exemplary embodiment, fuel-air mixer 200 includes outer ring 202, an intermediate hub 204, and an inner hub 206. Intermediate hub 204 is coaxially disposed within outer ring 202 about a central axis 220, and inner hub 206 is coaxially disposed about intermediate hub 204 about central axis 220. As such, in the exemplary embodiment, a first plenum 222 is defined between outer ring 202 and intermediate hub 204, and a second plenum 224 is defined between intermediate hub 204 and inner hub 206. As used herein, the term "axial", "axially", or "coaxially" refers to a direction along or substantially parallel to central axis 220. Furthermore, as used herein, the term "radial" or "radially" refers to a direction substantially perpendicular to central axis 220.

Furthermore, in the exemplary embodiment, first plenum 222 includes a first swirler 232 defined therein, and second plenum 224 includes a second swirler 234 defined therein. More specifically, first swirler 232 includes a first set of swirler vanes 240 such as a first swirler vane 242, a second swirler vane 244, a third swirler vane 246, a fourth swirler vane 248, a fifth swirler vane 250, a sixth swirler vane 252, a seventh swirler vane 254, an eighth swirler vane 256, a ninth swirler vane 258, and a tenth swirler vane 260. Second swirler 234 includes a second set of swirler vanes 270 such as a first swirler vane 272, a second swirler vane 274, a third swirler vane 276, a fourth swirler vane 278, and a fifth swirler vane 280. Although swirlers 232 and 234 are shown as including ten and five swirler vanes, respectively, it should be understood that swirlers 232 and 234 may include any suitable number of swirler vanes such that fuel-air mixer 200 functions as described herein. Furthermore, in the exemplary embodiment, swirler vanes 272, 274, 276, 278, and 280 are spaced circumferentially about inner hub 206 such that a plurality of inner passages are defined therebetween. For example, in the exemplary embodiment, a first inner passage 282 is defined between swirler vanes 272 and 274, a second inner passage 284 is defined between swirler vanes 274 and 276, a third inner passage 286 is defined between swirler vanes 276 and 278, a fourth inner passage 288 is defined between swirler vanes 278 and 280, and a fifth inner passage 290 is defined between swirler vanes 280 and 272.

Swirler vanes 240 are coupled to outer ring 202 and intermediate hub 204 such that swirler vanes 240 extend from outer ring 202 to intermediate hub 204. Similarly, swirler vanes 270 are coupled to intermediate hub 204 and inner hub 206 such that swirler vanes 270 extend from intermediate hub 204 to inner hub 206. In the exemplary embodiment, fuel-air mixer 200 includes a leading edge 236 and a trailing edge 238. Swirlers 232 and 234 are configured to rotate fluid flowing therethrough in opposite directions. For example, first swirler 232 is configured to rotate fluid flowing therethrough in a first direction 292 and second swirler 234 is configured to rotate fluid flowing therethrough in a second direction 294, wherein first direction 292 is different from second direction 294. As such, swirler vanes 240 and 270 are in different radial positions at trailing edge 238 than at leading edge 236. While swirlers 232 and 234 are configured to rotate fluid flowing therethrough in opposite directions in the exemplary embodiment, swirlers 232 and 234 may be configured to rotate fluid flowing therethrough in the same direction to facilitate enhancing the swirl for flame stabilization.

Furthermore, in the exemplary embodiment, fuel-air mixer 200 includes a plurality of fuel injection conduits defined therein for delivering fuel to first and second plenums 222 and 224. More specifically, fuel-air mixer 200 includes first fuel injection conduits 262, second fuel injection conduits 264, and/or third fuel injection conduits 266 (not shown in FIG. 3). First fuel injection conduits 262 extend through outer ring 202 and facilitate coupling first fuel plenum 210 (shown in FIG. 2) in flow communication with first plenum 222. As such, first plenum 222 receives fuel for mixing with air 162 (shown in FIG. 2) flowing through first swirler 232.

Known fuel-air mixers are unable to deliver fuel to second swirler 234 such that fluid flowing through second swirler 234 is substantially fuel-free. In the exemplary embodiment, second fuel injection conduits 264 extend through outer ring 202, swirler vanes 240, and intermediate hub 204 such that second fuel injection conduits 264 facilitate coupling first fuel plenum 210 in flow communication with second plenum 224. Second fuel injection conduits 264 may be defined within fuel-air mixer 200 by any suitable means. For example, second fuel injection conduits 264 may be drilled through outer ring 202, swirler vanes 240, and intermediate hub 204. More specifically, in the exemplary embodiment, second fuel injection conduits 264 extend through alternating swirler vanes 242, 246, 250, 254, and 258 of first swirler 232. As such, second fuel injection conduits 264 defined within swirler vanes 242, 246, 250, 254, and 258 facilitate injecting fuel into inner passages 290, 282, 284, 286, and 288 respectively, from first fuel plenum 210.

Figure 5:
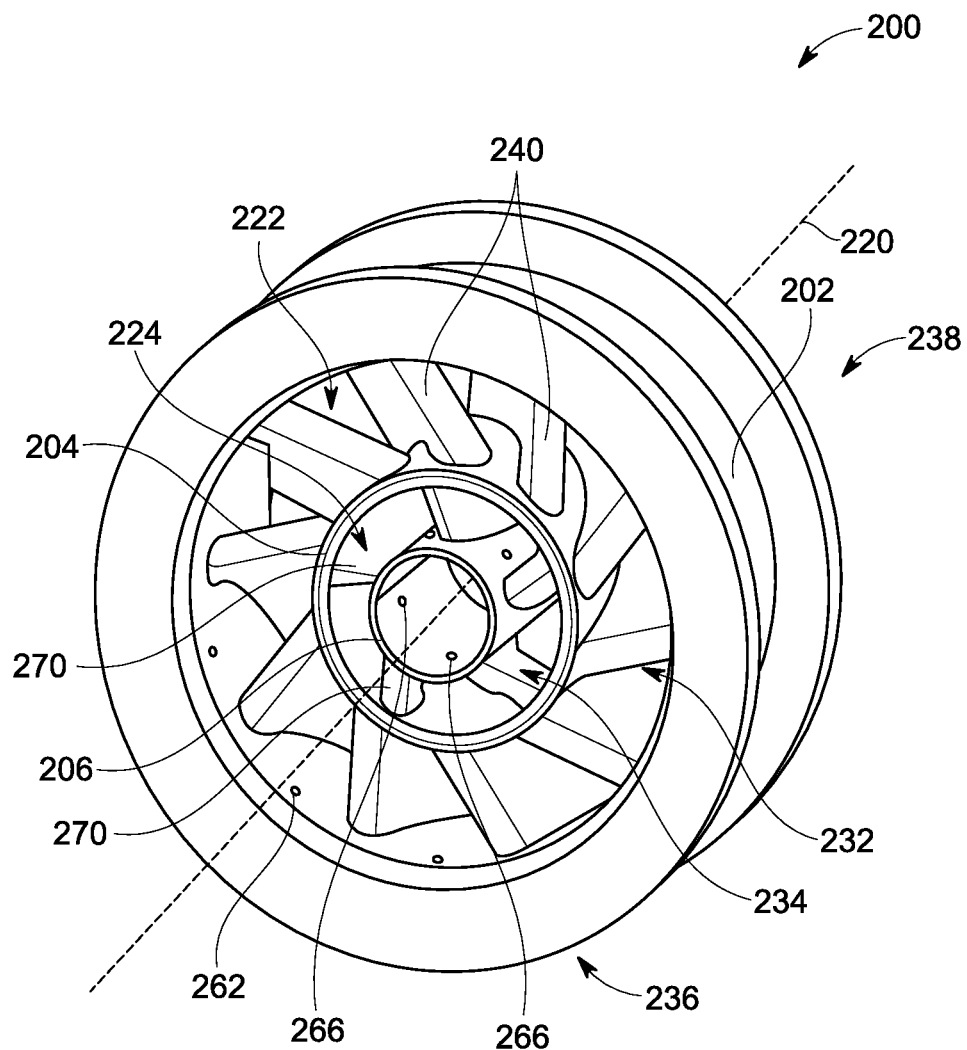
FIG. 5 is a perspective view of an alternative exemplary fuel-air mixer.

FIG. 5 is a perspective view of a fuel-air mixer 200 that includes third fuel injection conduits 266. In the exemplary embodiment, inner hub 206 is sized to receive a center body 300 (not shown in FIG. 5) and includes a plurality of third fuel injection conduits 266 defined therein. Third fuel injection conduits 266 extend through inner hub 206 for channeling fuel to second plenum 224. More specifically, in the exemplary embodiment, fuel injection conduits 266 extend through inner hub 206 to facilitate channeling fuel to inner passages 282, 284, 286, 288, and 290.

Fuel injection conduits 262, 264, and 266 are sized and oriented to facilitate the use of conventional and non-conventional fuels. For example, in the exemplary embodiment, fuel injection conduits 262, 264, and 266 are spaced circumferentially about outer ring 202, intermediate hub 204, and inner hub 206, respectively. Furthermore, the size of fuel injection conduits 262, 264, and 266 may be configured to control the fuel-air ratio flowing through swirlers 232 and 234. In the exemplary embodiment, fuel injection conduits 262, 264, and 266 are located at leading edge 236 of fuel-air mixer 200. As such, when air is channeled through swirlers 232 and 234, the mixing residence time is increased as the fuel-air mixture is channeled from leading edge 236 to trailing edge 238.

Figure 6:
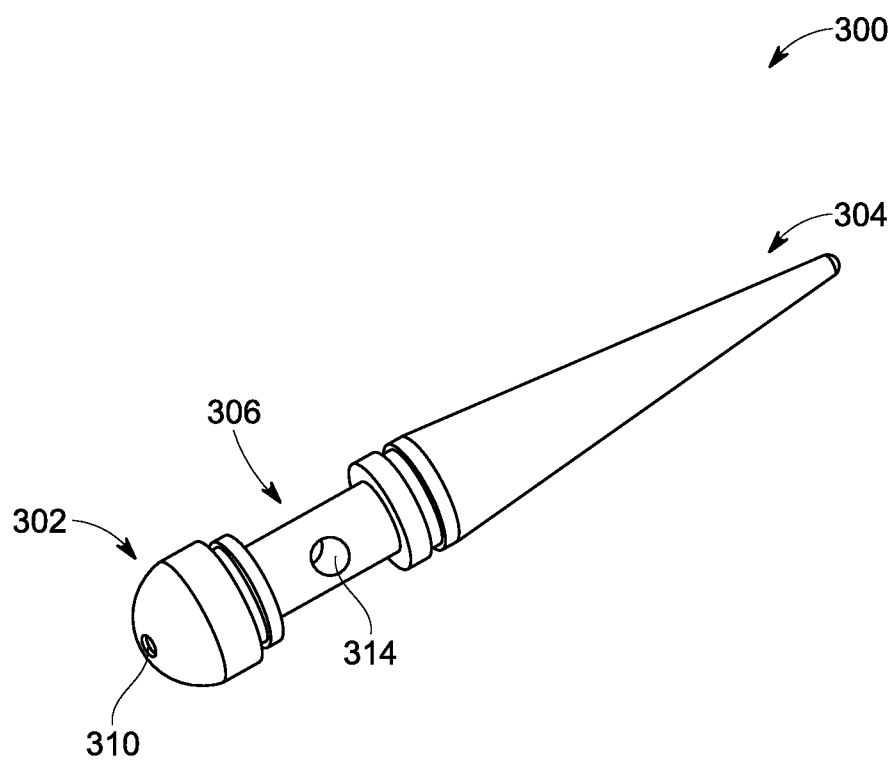
FIG. 6 is a perspective view of an exemplary center body that may be used with the fuel-air mixer shown in FIG. 5.
Figure 7:
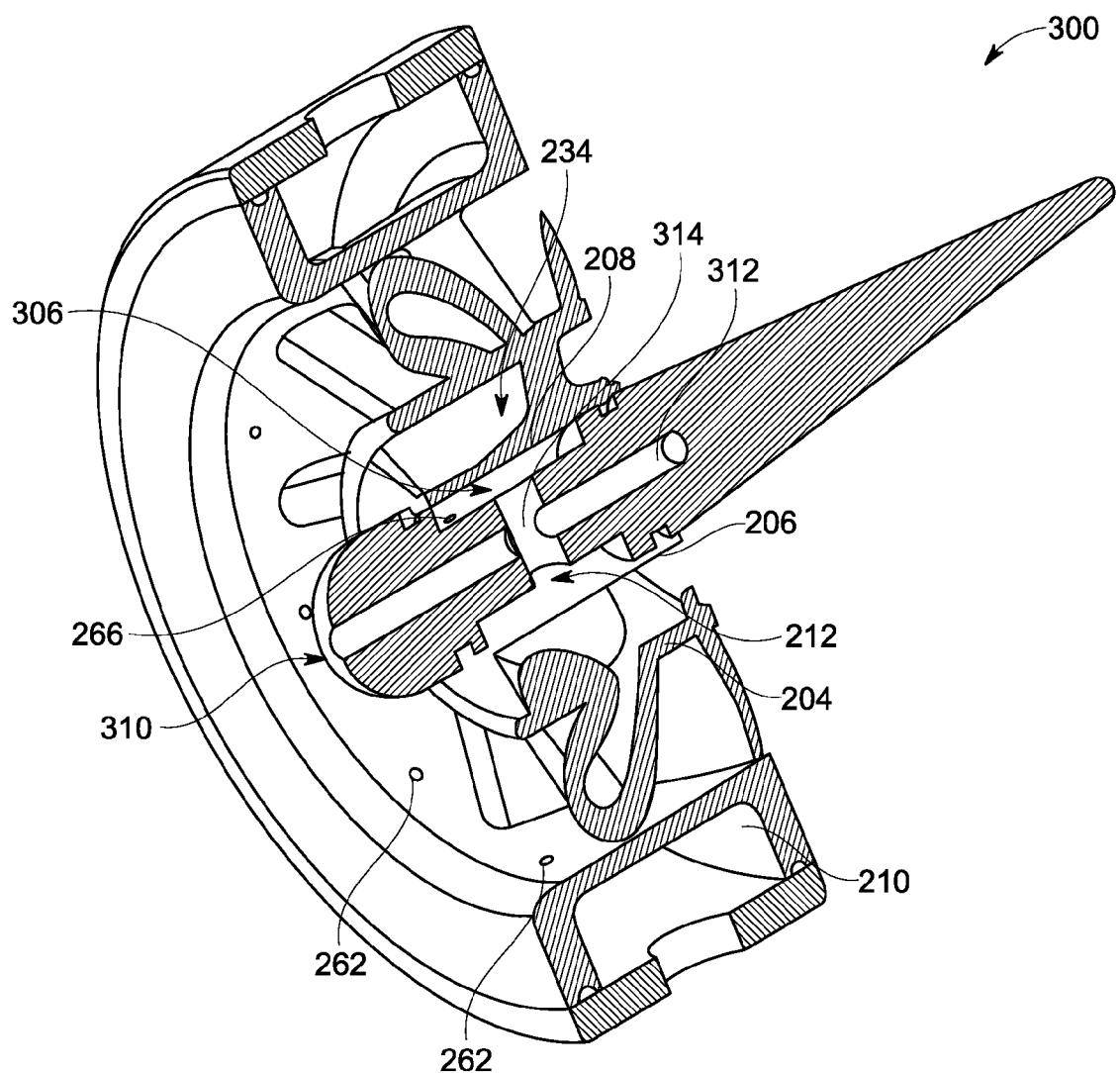
FIG. 7 is a perspective cross-sectional view of an assembled fuel-air mixer and center body.

FIG. 6 is a perspective view of center body 300, and FIG. 7 is a cross-sectional view of center body 300 assembled with fuel-air mixer 200. In the exemplary embodiment, center body 300 facilitates delivering fuel to second plenum 234. Center body 300 has a first end 302, a second end 304, and a recessed region 306 defined therebetween. In the exemplary embodiment, center body 300 includes a fuel inlet 310, a first fuel passage 312 defined therein, and a second fuel passage 314 defined therein. First fuel passage 312 axially extends at least partially through center body 300 and is coupled in flow communication with fuel inlet 310. Second fuel passage 314 extends radially through center body 300 such that second fuel passage 314 is in flow communication with first fuel passage 312. In the exemplary embodiment, second fuel passage 314 extends through center body 300 at recessed region 306.

In the exemplary embodiment, recessed region 306 is located between first end 302 and second end 304 and substantially circumscribes center body 300. Recessed region 306 has a smaller diameter than inner hub 206 such that when center body 300 is positioned within inner hub 206, a second fuel plenum 212 is defined between recessed region 306 and an inner surface 208 of inner hub 206. In the exemplary embodiment, fuel enters center body 300 through fuel inlet 310. Fuel is then channeled through first fuel passage 312 and exits center body 300 through second fuel passage 314. Fuel exiting center body 300 substantially fills second fuel plenum 212 such that fuel is delivered to second plenum 234 via third fuel injection conduits 266.

Figure 8:
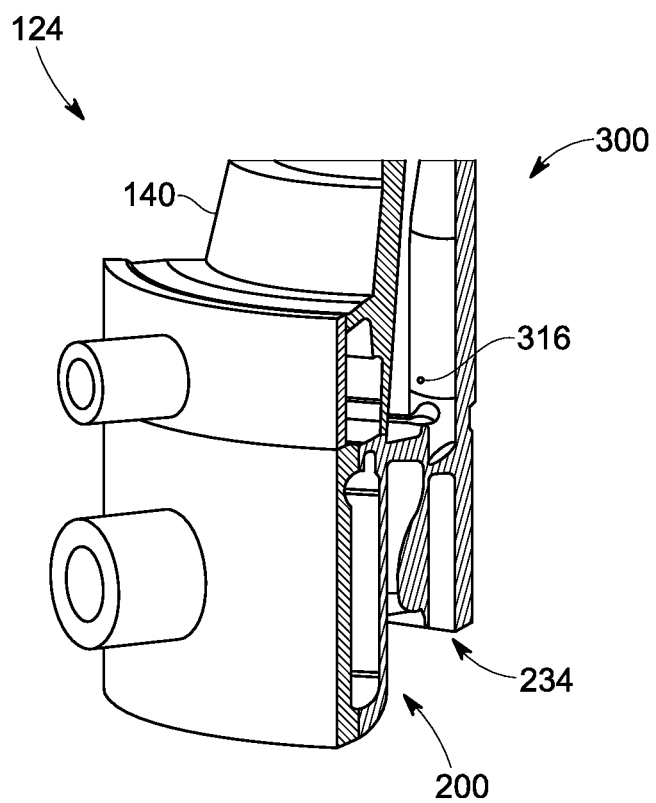
FIG. 8 is a perspective cross-sectional view of an alternative assembled fuel-air mixer and center body.

FIG. 8 is a perspective cross-sectional view of fuel-air mixer 200 and center body 300. In the exemplary embodiment, fuel-air mixer 300 includes a fuel injection aperture 316 defined therein for injecting fuel into mixing zone 146 (shown in FIG. 2). Fuel injection aperture 316 is coupled in flow communication with fuel inlet 310 (shown in FIG. 7) and is defined within center body 300 downstream of fuel-air mixer 200. Fuel that exits fuel injection aperture 316 combines with vitiated air exiting second swirler 234 such that a fuel-air mixture is channeled downstream into mixing zone 146.

The fuel-air mixer described herein facilitates enabling the use of non-conventional fuels in turbine engines. Generally, using non-conventional fuels in known fuel nozzles requires increasing the fuel jet velocity of fuel channeled to an outer swirler of the nozzle. Known fuel nozzles are optimized to accommodate a certain fuel jet velocity and increasing the fuel jet velocity may result in an undesirable pressure drop across the fuel injection conduits and/or result in the formation of NOx emissions. The fuel-air mixer described herein includes a plurality of fuel injection conduits for delivering fuel to the normally fuel-free inner swirler of the dual-annular counter-rotating swirler (DACRS) pre-mixer. Accordingly, the fuel injection conduits facilitate increasing the amount of fuel that may be supplied to the fuel-air mixer thereby enabling the use of non-conventional fuels therein.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A fuel-air mixer comprising:
   an outer ring;
   an intermediate hub disposed coaxially within said outer ring such that a first plenum is formed therebetween;
   an inner hub disposed coaxially within said intermediate hub such that a second plenum is formed therebetween;
   a first swirler comprising a plurality of first swirler vanes positioned between said outer ring and said intermediate hub, said first swirler configured to rotate fluid flowing therethrough in a first direction;

a second swirler comprising a plurality of second swirler vanes positioned between said intermediate hub and said inner hub, said second swirler configured to rotate fluid flowing therethrough in a second direction; and a plurality of fuel injection conduits defined within the fuel-air mixer for channeling fuel to said first and second plenums;

a center body positioned within said inner hub, said center body configured to channel fuel to said second plenum, wherein said plurality of fluid injection conduits are configured to inject fuel into said first and second plenums at a leading edge of the fuel-air mixer; and wherein said plurality of fluid injection conduits includes a fluid injection conduit that extends through said outer ring, at least one vane of said plurality of first swirler vanes, and injection orifices through said intermediate hub for injecting fuel to said second plenum.

2. The fuel-air mixer in accordance with claim 1, wherein said plurality of fluid injection conduits includes a fluid injection conduit that extends through said outer ring for channeling fuel to said first plenum.

3. The fuel-air mixer in accordance with claim 1, wherein said second swirler vanes are spaced circumferentially about said inner hub such that an inner passage is defined between adjacent said second swirler vanes.

4. The fuel-air mixer in accordance with claim 3, wherein fuel is channeled to said second plenum at each said inner passage.

5. The fuel-air mixer in accordance with claim 1, wherein said center body comprises a recessed region, a fuel plenum is formed between an inner surface of said inner hub and said center body at said recessed region when said center body is positioned within said inner hub.

6. The fuel-air mixer in accordance with claim 5, wherein said plurality of fluid injection conduits includes a fluid injection conduit that extends through said inner hub and is configured to facilitate coupling said second plenum in flow communication with said fuel plenum.

7. The fuel-air mixer in accordance with claim 5, wherein said center body comprises a first fuel passage and a second fuel passage defined therein, said second fuel passage extending through said center body such that said first fuel passage is coupled in flow communication with said fuel plenum.

8. A combustor assembly comprising:
a combustor; and
a fuel-air mixer according to claim 1.

9. The combustor assembly in accordance with claim 8, wherein said fuel-air mixer comprises a shroud that substantially circumscribes said outer ring such that a second fuel plenum is formed between said shroud and said outer ring.

10. The combustor assembly in accordance with claim 8, wherein said plurality of fluid injection conduits includes a fluid injection conduit that extends through said outer ring, at least one vane of said plurality of first swirler vanes, and said intermediate hub such that said first plenum is coupled in flow communication with said second plenum.

11. The combustor assembly in accordance with claim 8, wherein when the first swirler is configured to rotate fluid flowing therethrough in a first direction and the second swirler is configured to rotate fluid flowing therethrough in a second direction, the first direction is different than the second direction.

12. The combustor assembly in accordance with claim 8 wherein said center body is configured to channel fuel to at least one of said second plenum and a mixing zone of said fuel-air mixer.

13. The combustor assembly in accordance with claim 12, wherein said center body comprises a fuel injection aperture located downstream of said fuel-air mixer.

14. A method of assembling a fuel-air mixer comprising:
providing an outer ring;
positioning an intermediate hub coaxially within the outer ring such that a first plenum is formed therebetween;
positioning an inner hub coaxially within the intermediate hub such that a second plenum is formed therebetween;
coupling a first swirler between the outer ring and the intermediate hub, the first swirler including a plurality of first swirler vanes configured to rotate fluid flowing therethrough in a first direction;
coupling a second swirler between the intermediate hub and the inner hub, the second swirler including a plurality of second swirler vanes configured to rotate fluid flowing therethrough in a second direction;
defining a plurality of fuel injection conduits within the fuel-air mixer for channeling fuel to the first and second plenums at a leading edge of the fuel-air mixer, wherein defining a plurality of fuel injection conduits further comprises extending a fuel injection conduit through the outer ring, at least one vane of the plurality of first swirler vanes, and injection orifices through the intermediate hub for injecting fuel to said second plenum; and
positioning a center body within the inner hub such that a fuel plenum is formed therebetween.

15. The method in accordance with claim 14, wherein defining a plurality of fuel injection conduits further comprises extending a fuel injection conduit through the inner hub such that the second plenum is in flow communication with the fuel plenum.

* * * * *